United States Patent [19]
Chen et al.

[11] Patent Number: 6,139,680
[45] Date of Patent: Oct. 31, 2000

[54] EXHAUST LINE OF CHEMICAL-MECHANICAL POLISHER

[75] Inventors: Chien-Hung Chen, Hsinchu; Hsueh-Chung Chen, Yung-Ho, both of Taiwan

[73] Assignee: United Microelectronics Corp., Taiwan

[21] Appl. No.: 09/212,371

[22] Filed: Dec. 15, 1998

[51] Int. Cl.$^7$ .................................................. C23F 1/02
[52] U.S. Cl. .......................... 156/345; 438/692; 451/488
[58] Field of Search ........................... 438/692; 451/488; 156/345

[56] References Cited

U.S. PATENT DOCUMENTS 5,584,959  12/1996  Kimura et al. .......................... 156/345

*Primary Examiner*—Shrive Beck
*Assistant Examiner*—Norca L. Torres
*Attorney, Agent, or Firm*—Blakely Sokoloff Taylor & Zafman

[57] ABSTRACT

An improved exhaust line of a chemical-mechanical polisher will improve polishing performance. A chemical-mechanical polisher is in a polishing chamber, wherein the chemical-mechanical polisher contains a polishing table, a plurality of polishing pads on the polishing table, and a plurality of outlets on the polishing table. A plurality of exhaust lines is connected with the plurality of the outlets, wherein the exhaust lines are used to drive out exhaust gas and sewage generated in the polishing chamber. At least a gas-liquid separating device is connected with the plurality of the exhaust lines, wherein the gas-liquid separating device is used for separation of the exhaust and the sewage. The gas-liquid separating device comprises a sewage collector, a filter, a pump, and a sewage-collecting device. The sewage collector is connected with the plurality of the outlets, wherein the sewage collector is used for collecting the exhaust gas and the sewage driven out through the plurality of outlets. The filter is connected with the top of the gas-liquid separating device. The pump is connected with the filter. The sewage-collecting device is connected with the bottom of the gas-liquid separating device, wherein the sewage-collecting device is used for collecting the sewage.

3 Claims, 2 Drawing Sheets

6,139,680

EXHAUST LINE OF CHEMICAL-MECHANICAL POLISHER

BACKGROUND OF THE INVENTION

1. Field of Invention

The present invention relates to an exhaust line used for driving out exhaust gas and sewage in a semiconductor structure. More particularly, the present invention relates to an exhaust line of a chemical-mechanical polisher.

2. Description of Related Art

With progress of a semiconductor technology, a spin-on glass (SOG) method that is a conventional method for planarization is not sufficient for the progressing semiconductor technology. Chemical-mechanical polishing (CMP) is a new technology that is gradually replacing SOG. CMP had become a popular method for planarization. CMP uses "polishing pad", which is similar to an abrasive paper, to polish a non-uniform wafer surface. During the polishing process, a suitable chemical reagent is added to help the polishing process. As long as the polishing process is well controlled, CMP can provide global planarization and a high degreed of planarization for wafers.

In the polishing process, a chemical reagent, which is called "slurry", is added to a wafer. Slurry is mainly composed of colloidal silica, or a mixture of dispersed alumina, alkaline potassium hydroxide (KOH), and ammonium hydroxide ($NH_4OH$). The slurry reacts with the material to be removed, and breaks the bonds between molecules. Then, the material reacting with the slurry is removed by mechanical force applied by the polishing pad. The main parameters controlling a CMP process include the slurry, the polishing pad material, the operating temperature, and the pH of the slurry.

In general, when metallic material is polished, hydrogen peroxide ($H_2O_2$) solution is added into slurry to control the pH. When oxide material is polished, potassium hydroxide (KOH) solution is added into the slurry to control the pH. Since $H_2O_2$ and $NH_4OH$ vapors are hazardous to human health, exhaust lines are necessarily designed on a chemical-mechanical polisher.

Referring to FIG. 1, FIG. 1 is a schematic, structural view of a conventional exhaust line of a chemical-mechanical polisher. A polishing chamber 100 is a closed system. A polishing table 11 is centrally located in the polishing chamber 100. A plurality of polishing pads 10 is on the polishing table 11. A gas outlet 12, connecting with a gas exhaust line, is at the top of the polishing chamber 100. A liquid outlet 14, connecting with a liquid exhaust line, is on the polishing table 11. While performing a polishing process, a wafer is first placed on the polishing pad 10. Using a polishing pad and adding slurry, the wafer is polished. During the polishing process, exhaust gases and sewage generate in the polishing chamber 100 due to reaction of the slurry and the material to be removed from the wafer. The exhaust gas is driven out through the gas outlet 12, using a pump. The sewage is driven out through the liquid outlet 14.

However, slurry is a suspension, and some solids are suspended in the slurry. If solvent ($H_2O$) of the slurry evaporates, solids remain. During the polishing process, the exhaust gas is driven out through the gas outlet 12 and the sewage is simultaneously driven out through the liquid outlet 14, so that a portion of the slurry evaporates. Some solids remained on the walls of the gas exhaust line. When the polisher is used for a long time, aggregated grains of solids are generated on the walls of the gas exhaust line. Due to gravity, the grains may fall on the polishing pad 10. While performing the polishing process, scratches, caused by contaminating grains on the wafer, are easily generated on the wafer, so that device yield is thus reduced.

SUMMARY OF THE INVENTION

Accordingly, the present invention provides an exhaust line of a chemical-mechanical polisher. Since slurry is a suspension, solids aggregate as grains. The exhaust line of the chemical-mechanical polisher can avoid the condition in which grains fall on a wafer to lead to wafer contamination. Scratches, caused by contaminating grains on the wafer, are not generated on the wafer, so that device yield is increased.

To achieve these and other advantages and in accordance with the purpose of the invention, as embodied and broadly described herein, the invention provides an exhaust line for a chemical-mechanical polisher. A chemical-mechanical polisher is in a polishing chamber, wherein the chemical-mechanical polisher contains a polishing table, a plurality of polishing pads on the polishing table, and a plurality of outlets in the polishing table. A plurality of exhaust lines are connected with the plurality of the outlets, wherein the exhaust lines are used to drive out exhaust gas and sewage generated in the polishing chamber. At least a gas-liquid separating device is connected with the plurality of the exhaust lines, wherein the gas-liquid separating device is used for separation of the exhaust and the sewage. The gas-liquid separating device comprises a sewage collector, a filter, a pump, and a sewage-collecting device. The sewage collector is connected with the plurality of the outlets, wherein the sewage collector is used for collecting the exhaust gas and the sewage driven out through the plurality of outlets. The filter is connected with the top of the gas-liquid separating device. The pump is connected with the filter. The sewage-collecting device is connected with the bottom of the gas-liquid separating device, wherein the sewage-collecting device is used for collecting the sewage.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
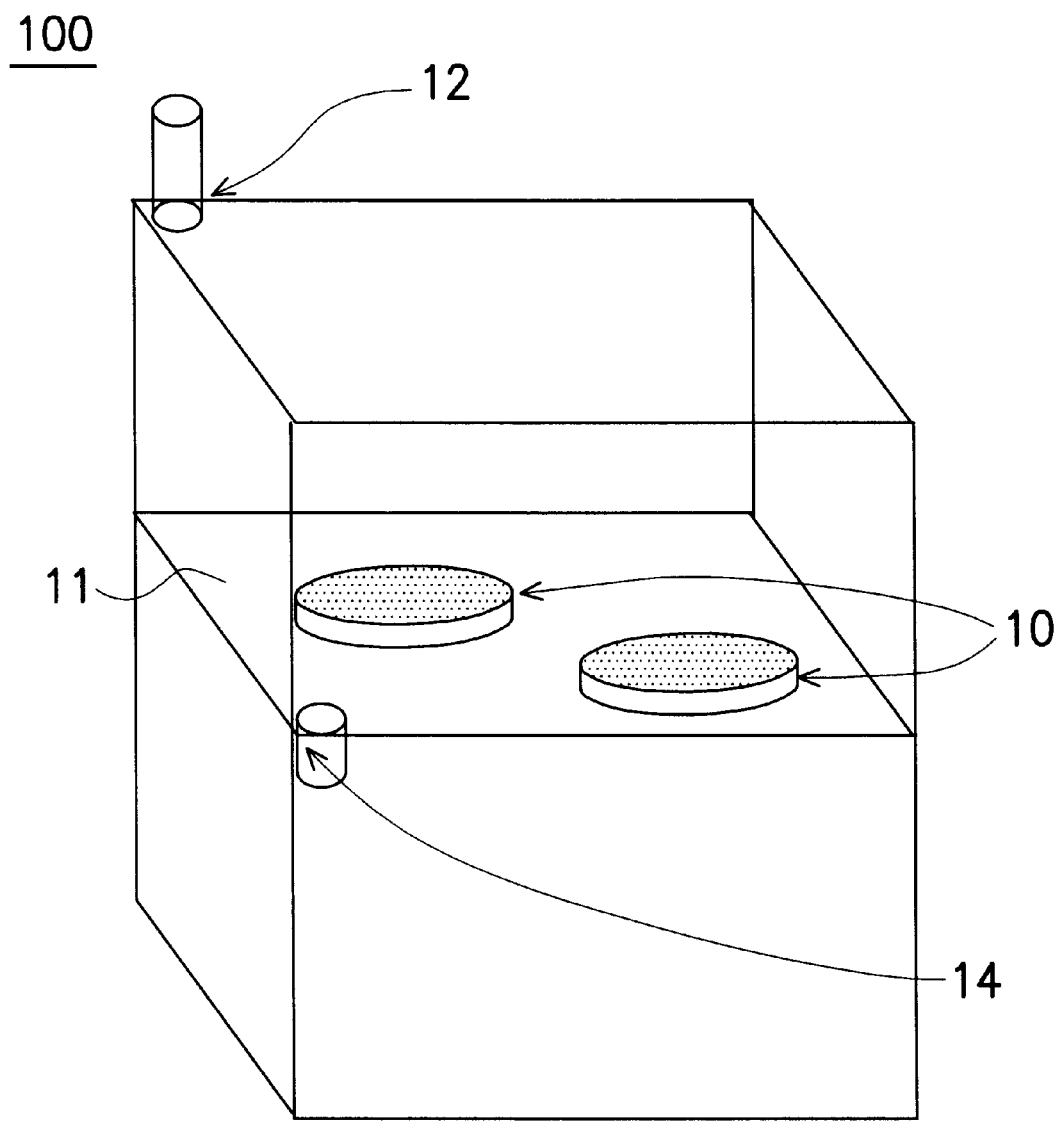
FIG. 1 is a schematic, structural view showing a conventional exhaust line of a chemical-mechanical polisher.

Reference will now be made in detail to the present preferred embodiments of the invention, examples of which are illustrated in the accompanying drawings. Wherever possible, the same reference numbers are used in the drawings and the description to refer to the same or like parts.

Figure 2:
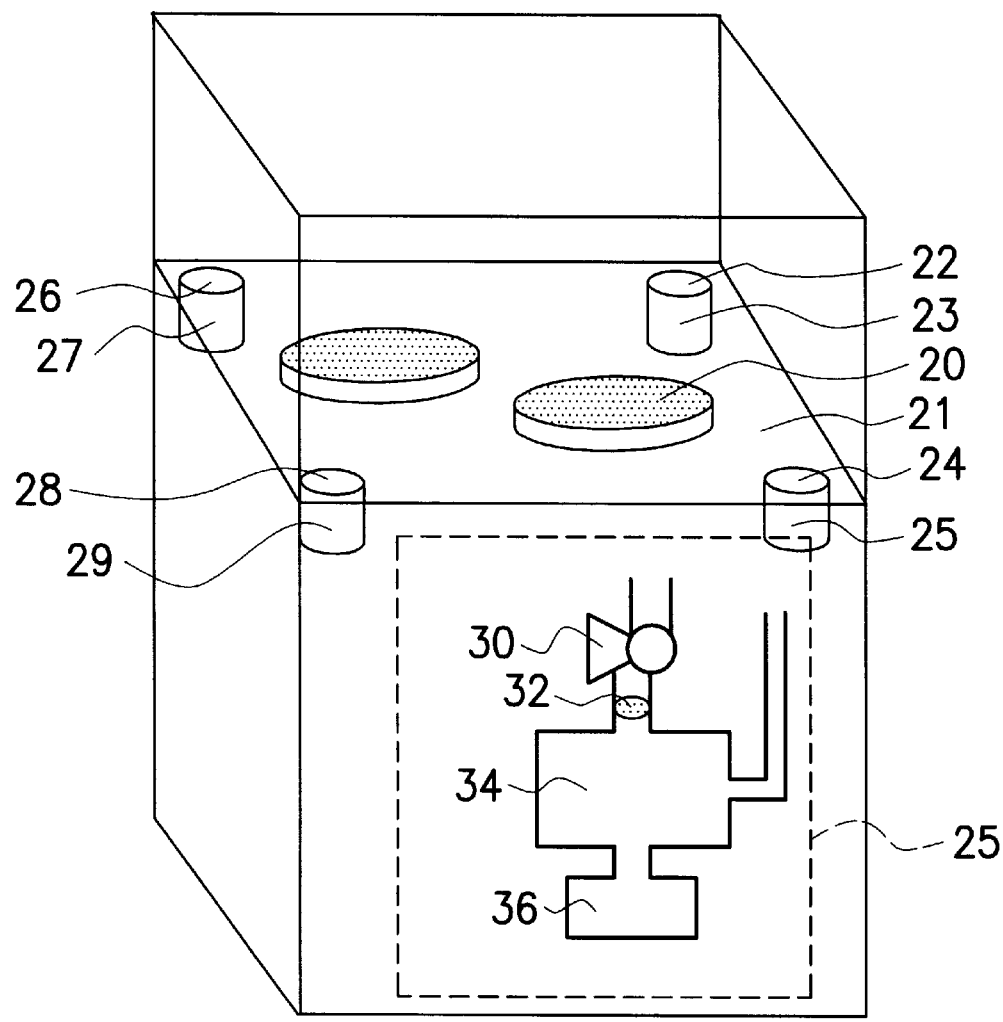
FIG. 2 is a schematic, structural view showing an exhaust line of a chemical-mechanical polisher according to one preferred embodiment of this invention.

FIG. 2 is a schematic, structural view showing an exhaust line of a chemical-mechanical polisher according to the preferred embodiment of the invention.

As shown in FIG. 2, a polishing chamber 200 is a closed system. A polishing table 21 is located in the center of the polishing chamber 200. A plurality of polishing pads 20 is on the polishing table 21. A plurality of outlets, for example, four outlets 22, 24, 26, 28, connecting with a plurality of exhaust lines 23, 25, 27, 29, are on the polishing table 21. The outlets 22, 24, 26, 28 are preferably at the four corner of the polishing table 21. A wafer is placed on the polishing pad 20 and slurry is added to the wafer to perform the polishing process. The pH of the slurry affects the polishing process. In general, when metallic material is polished, hydrogen peroxide ($H_2O_2$) solution is added to the slurry to control the pH of the slurry. When oxide material is polished, potassium hydroxide (KOH) solution or ammonium hydroxide ($NH_4OH$) is added to the slurry to control the pH of the slurry. During the polishing process, exhaust gas and sewage are generated. The exhaust gas and the sewage could include some material generated from reaction of the slurry and the material to be removed from the wafer, hydrogen peroxide ($H_2O_2$), potassium hydroxide (KOH), and ammonium hydroxide ($NH_4OH$). The exhaust gas and the sewage are driven out through the same outlets 22, 24, 26, 28. Therefore, a plurality of outlets is used in order to increase the speeds of driving out the exhaust gas and the sewage. In the conventional chemical-mechanical polisher, the gas exhaust line is at the top of the polishing chamber. While performing the polishing process, a portion of the slurry is evaporated. Some solids remain on the walls of the gas exhaust line. When the polisher is used for a long time, grains aggregated from the solids are generated on the walls of the gas exhaust line. In the invention, exhaust gases and sewage are driven out through the same outlets 22, 24, 26, 28. Since liquids flow through the outlets, solids in the slurry do not easily aggregate on the walls of the exhaust lines 23, 25, 27, 29. Thus, condition in which grains would fall on the wafer can be avoided.

Additionally, these exhaust lines of the exhaust gas and the sewage can be connected with at least a gas-liquid separating device 35. Since the exhaust gas and the sewage have the same outlets 22, 24, 26, 28, and they use the same pumps, the exhaust gas and the sewage can be separated in the gas-liquid separating device 35. Moreover, the gas-liquid separating device 35 can prevent the pumps from being damaged by the sewage entering into the pumps of the exhaust gas. The gas-liquid separating device 35 includes a sewage collector 34, a filter 32, a pump 30, and a sewage-collecting device 36. The sewage collector 34 collects the exhaust gas and the sewage driven out through the outlets 22, 24, 26, 28. Then, the exhaust gas is first filtrated by the filter 32 and is driven out by the pump 30. The sewage is driven out into the sewage collector 34. Thus, separation of the exhaust gas and the sewage is achieved, using the gas-liquid separating device 35.

Accordingly, in the invention, a plurality of outlets is designed on the polishing table. Since the exhaust gas and the sewage have the same outlets and the sewage flows through the outlets, solids in the slurry do not easily aggregate as grains on the walls of the exhaust lines. Thus, condition in which grains would fall on the wafer to lead to contamination of the wafer can be avoided. Scratches caused by contaminating grains are not generated on the wafer, so that device yield is increased. In addition, at least a gas-liquid separating device is connected with the outlets. Separation of the exhaust gas and the sewage is achieved, using the gas-liquid separating device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A chemical-mechanical polisher in a polishing chamber, wherein the chemical-mechanical polisher includes a polishing table, a plurality of polishing pads on the polishing table, and a plurality of outlets on the polishing table, comprising:

a plurality of exhaust lines, a first end of the exhaust lines connecting with the plurality of the outlets, wherein an exhaust gas and a sewage generated in the polishing chamber are driven out without separation through the exhaust lines; and at least a gas-liquid separating device, a second end of the exhaust lines connecting with the plurality of the exhaust lines, wherein the gas-liquid separating device is used for separation of the exhaust and the sewage.

2. The chemical-mechanical polisher according to claim 1, wherein the plurality of outlets is in the corners of the polishing table.

3. The chemical-mechanical polisher according to claim 1, wherein the gas-liquid separating device comprises:

a sewage collector, connecting with the plurality of the outlets, wherein the sewage collector is used for collecting the exhaust gas and the sewage driven out through the plurality of outlets;

a filter, connecting with the top of the gas-liquid separating device;

a pump, connecting with the filter;

a sewage collecting device, connecting with the bottom of the gas-liquid separating device, wherein the sewage collecting device is used for collecting the sewage.

* * * * *